(12) United States Patent
Kido

(10) Patent No.: US 8,737,689 B2
(45) Date of Patent: May 27, 2014

(54) ENVIRONMENT RECOGNITION DEVICE AND ENVIRONMENT RECOGNITION METHOD

(75) Inventor: Shinnosuke Kido, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 73 days.

(21) Appl. No.: 13/455,543

(22) Filed: Apr. 25, 2012

(65) Prior Publication Data

US 2012/0288156 A1 Nov. 15, 2012

(30) Foreign Application Priority Data

May 12, 2011 (JP) ................................. 2011-107688

(51) Int. Cl.
*G06K 9/36* (2006.01)
(52) U.S. Cl.
USPC .......................................... 382/104; 382/274
(58) Field of Classification Search
None
See application file for complete search history.

(56) References Cited

U.S. PATENT DOCUMENTS

2010/0074469 A1* 3/2010 Nakamori et al. ............ 382/103

FOREIGN PATENT DOCUMENTS

| JP | 3349060 B2 | 11/2002 |
| JP | 2006-338555 A | 12/2006 |
| JP | 2010-224925 A | 10/2010 |

* cited by examiner

*Primary Examiner* — Brian P Werner
(74) *Attorney, Agent, or Firm* — McDermott Will & Emery LLP

(57) ABSTRACT

A environment recognition device obtains luminances of a target portion existing in an area specifies a road surface luminance and a reference portion luminance; when the road surface luminance changes by a predetermined value or more, the reference portion luminance does not change by another predetermined value or more, and the changed road surface luminance is not a predetermined color, maintains a white balance correction value prior to the change until the road surface luminance returns to the predetermined color, and, in other cases, derives a white balance correction value to recognize the road surface luminance as the predetermined color; derives a corrected luminance by performing a white balance correction using the white balance correction value on the obtained luminance; and provisionally determines a object corresponding to the target portion from a corrected luminance of the target portion based on an association of a luminance range and the specific object.

15 Claims, 13 Drawing Sheets

FIG. 4

| IDENTIFICATION NUMBER | | 1 | 2 | 3 | 4 | 5 | 6 | 7 | 8 |
|---|---|---|---|---|---|---|---|---|---|
| SPECIFIC OBJECT | | TRAFFIC LIGHT (RED) | TRAFFIC LIGHT (YELLOW) | TRAFFIC LIGHT (BLUE) | TAIL LAMP (RED) | TURNING INDICATOR (ORANGE) | ROAD SIGN (RED) | ROAD SIGN (BLUE) | ROAD SIGN (GREEN) |
| LUMINANCE RANGE | RED | ≥200 | ≥100 | ≤50 | ≥180 | ≥150 | ≥150 | ≤50 | ≤50 |
| | GREEN | ≤50 | ≥150 | ≥200 | ≤50 | ≥100 | ≤50 | ≤50 | ≥200 |
| | BLUE | ≤50 | ≤50 | ≤100 | ≤50 | ≤50 | ≤50 | ≥200 | ≤50 |
| WIDTH RANGE (m) | | 0.1 TO 0.3 | 0.1 TO 0.3 | 0.1 TO 0.3 | 0.1 TO 0.2 | 0.1 TO 0.2 | 0.3 TO 1.0 | 0.3 TO 1.0 | 0.3 TO 1.0 |

ENVIRONMENT RECOGNITION DEVICE AND ENVIRONMENT RECOGNITION METHOD

CROSS-REFERENCE TO RELATED APPLICATIONS

The present application claims priority from Japanese Patent Application No. 2011-107688 filed on May 12, 2011, the entire contents of which are hereby incorporated by reference.

BACKGROUND OF THE INVENTION

1. Field of the Invention

The present invention relates to an environment recognition device and an environment recognition method for recognizing a target object based on a luminance of the target object in a detection area.

2. Description of Related Art

Conventionally, a technique has been known that detects a target object such as an obstacle including a vehicle and a traffic light located in front of a subject vehicle for performing control to avoid collision with the detected target object and to maintain a safe distance between the subject vehicle and the preceding vehicle (for example, Japanese Patent No. 3349060 (Japanese Patent Application Laid-Open (JP-A) No. 10-283461)).

Further, in such techniques, there is a technique that performs more advanced control. Specifically, it not only specifies a target object uniformly as a solid object, but further determines whether the detected target object is a preceding vehicle that is running at the same speed as the subject vehicle or a fixed object that does not move. In this case, when the target object is detected by capturing an image of a detection area, it is necessary to extract (cut out) the target object from the captured image before specifying what the target object is.

For example, there is known a technique that recognizes, when the captured image is a color image, a light source such as a traffic light as a target object by grouping a set of pixels with a same luminance (color) (for example, JP-A No. 2010-224925). However, such a target object may change in color due to an influence of environmental light such as sunlight and illumination light. A solution for removing the influence of the environmental light may be performing a white balance correction on the captured image. For example, there is known a technique that extracts a region corresponding to a road surface from a captured image and performs the white balance correction thereon (for example, JP-A No. 2006-338555).

When a subject vehicle is driving on a road, the road occupies a detection area in many cases. Thus, on the premise that the road surface is gray, it is preferable to extract a region corresponding to the road surface and to perform a white balance correction such that the road surface becomes gray. However, a typical road surface has a portion such as a school zone whose color is different from gray (for example, green). If a white balance correction that simply makes a conversion to gray is performed on a road surface colored with a color different from gray, the white balance in the detection area is lost.

Since there are fewer roads colored with a color different from gray than roads colored gray, a solution for avoiding such a circumstance may be excluding such roads with a low-pass filter. However, since roads with a color different from gray are not always short, it is difficult to uniquely define a parameter for the low-pass filter. Further, in the case of an entrance of a tunnel and the like, where environment light drastically changes, delay due to the filter may affect responsiveness of control.

SUMMARY OF THE INVENTION

In view of the above problems, the present invention aims to provide an environment recognition device and an environment recognition method that are capable of performing an appropriate white balance correction without accompanying response delay.

In order to achieve the object, an aspect of the present invention provides an environment recognition device that includes: a data retaining unit that retains a luminance range in association with a specific object; a luminance obtaining unit that obtains a luminance of a target portion in a detection area; a luminance specifying unit that specifies a luminance of a road surface and a luminance of a predetermined reference portion other than a road surface from among the obtained luminances; a white balance deriving unit that derives a white balance correction value such that the luminance of the road surface is recognized as a predetermined color; a white balance performing unit that derives a corrected luminance by performing a white balance correction using the white balance correction value on the obtained luminances; and a specific object provisional determining unit that provisionally determines a specific object corresponding to the target portion with a corrected luminance of the target portion based on the association retained in the data retaining unit. When a luminance of the road surface changes by a first predetermined value or more under a state in which a luminance of the reference portion does not change by a second predetermined value or more, and the luminance of the road surface after the change is not the predetermined color, the white balance deriving unit maintains the white balance correction value prior to the change from when the change occurs until the luminance of the road surface returns to the predetermined color.

The reference portion may be a line that restricts a track on the road surface within the detection area.

The road surface may be a neighborhood area of the reference portion that is defined based thereon.

The white balance deriving unit may obtain the luminances of the road surface and the luminances of the reference portion at different times in a predetermined first partial area within the detection area to derive the change thereof.

The white balance deriving unit may obtain the luminances of the road surface and the luminances of the reference portion in a predetermined first partial area within the detection area and a second partial area that is separated from the first partial area in the vertical direction within the detection area to derive the change thereof.

The white balance deriving unit may determine that the luminance changes if a difference between a difference in the color phase selected on the basis of a maximum phase value of the luminances representing the road surface and a difference in the color phase selected on the basis of the minimum phase value of the luminances representing the road surface is a third predetermined value or more.

The white balance deriving unit may obtain a maximum phase value of a luminance representing the road surface, and may determine as the white balance correction value a ratio that causes a phase value different from the color phase whose phase value is the maximum to be the maximum.

The white balance deriving unit may obtain a second largest phase value of a luminance representing the road surface, and may determine as the white balance correction value a ratio that causes a phase value different from the color phase whose phase value is the second largest to be the second largest.

The white balance deriving unit may obtain a minimum phase value of a luminance representing the road surface, and may determine as the white balance correction value a ratio that causes a phase value different from the color phase whose phase value is the minimum to be the minimum.

The luminance specifying unit may specify the luminance of the road surface and the luminance of the reference area according to a predetermined area within the detection area that is limited in a vertical direction based on a position of a preceding vehicle or a specific object in front of the subject vehicle.

In order to achieve the above object, another aspect of the present invention provides an environment recognition method that includes: obtaining a luminance of a target portion in a detection area; specifying a luminance of a road surface and a luminance of a predetermined reference portion that is other than the road surface from the obtained luminances; maintaining, when a luminance of the road surface changes by a first predetermined value or more under a state in which the luminance of the reference portion does not change by a second predetermined value or more, and if the luminance of the road surface after the change is not a predetermined color, a white balance correction value prior to she change from when the change occurs until the luminance of the road surface returns to the predetermined color, and deriving a white balance correction value so that the luminance of the road surface can be recognized as a specific color in cases other than the above; deriving a corrected luminance by performing a white balance correction using the white balance correction value on the obtained luminances; and provisionally determining a specific object corresponding to the target portion from a corrected luminance of the target portion based on an association of a luminance range with the specific object retained in the data retaining unit.

According to the present invention, a highly accurate detection is performed as to whether a luminance of the road surface is changed due to the environmental light or the coloring of the road surface itself, and it is possible to realize the white balance correction appropriately without accompanying response delay.

BRIEF DESCRIPTION OF THE SEVERAL VIEWS OF THE DRAWINGS

FIG. 4 is an explanatory diagram for explaining a specific object table;

DETAILED DESCRIPTION OF THE INVENTION

Figure 1:
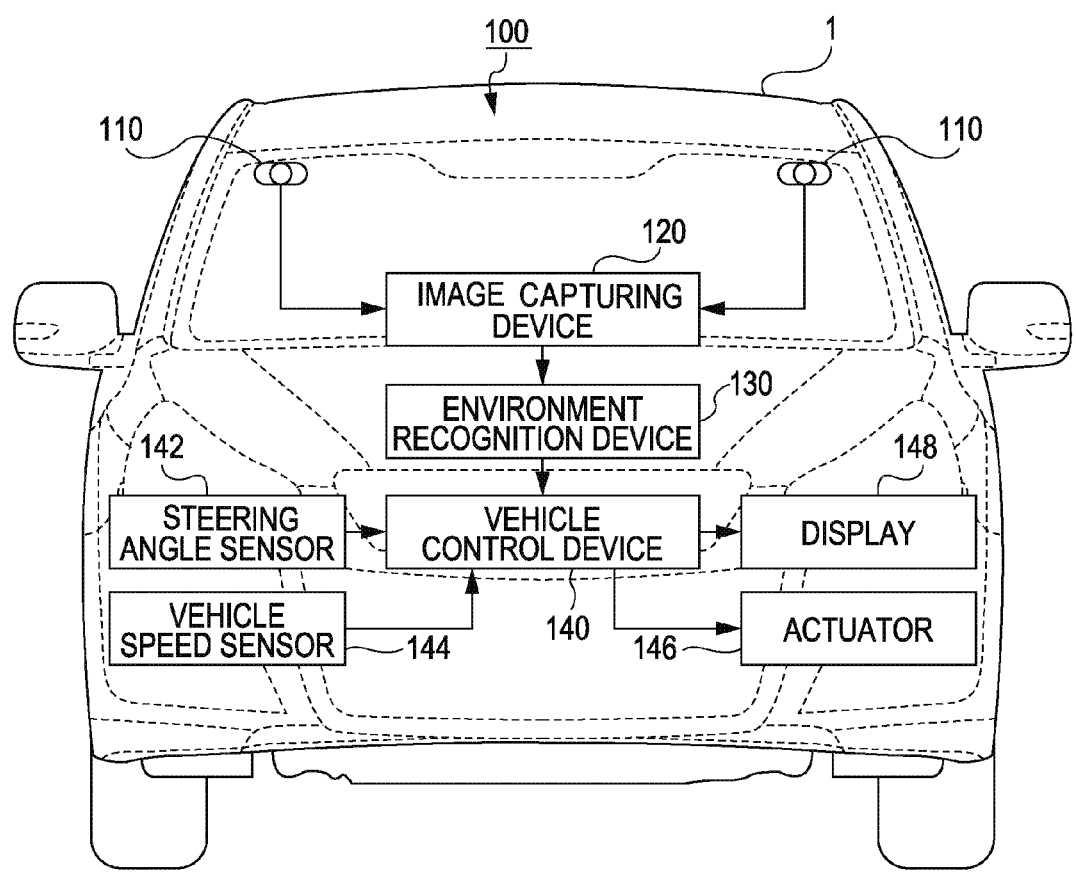
FIG. 1 is a block diagram illustrating a connection relationship in an environment recognition system.

A preferred embodiment of the present invention will be hereinafter explained in detail with reference to attached drawings. The size, materials, and other specific numerical values shown in the embodiment are merely exemplification for the sake of easy understanding of the invention, and unless otherwise specified, they do not limit the present invention. In the specification and the drawings, elements having substantially same functions and configurations are denoted with same reference numerals, and repeated explanation thereabout is omitted. Elements not directly related to the present invention are omitted in the drawings.

(Environment Recognition System 100)

FIG. 1 is a block diagram illustrating connection relationship in an environment recognition system 100. The environment recognition system 100 includes a plurality of image capturing devices 110 (two image capturing devices 110 in the present embodiment), an image processing device 120, an environment recognition device 130, and a vehicle control device 140 that are provided in a vehicle 1.

The image capturing devices 110 include an imaging element such as a CCD (Charge-Coupled Device) and a CMOS (Complementary Metal-Oxide Semiconductor), and can obtain a color image, that is, a luminance consists of three color phases (red, green, blue) per pixel. In the present embodiment, color and luminance are dealt in the same way; if both wordings are included in one sentence, both can be read as luminance configuring color, or color having luminance. In this case, a color image captured by the image capturing devices 110 is referred to as luminance image and is distinguished from a distance image to be explained later. The image capturing devices 110 are disposed to be spaced apart from each other in a substantially horizontal direction so that optical axes of the two image capturing devices 110 are substantially parallel in a proceeding direction of the vehicle 1. The image capturing device 110 continuously generates image data obtained by capturing an image of a target object in a detection area in front of the vehicle 1 at every 1/60 seconds (60 fps), for example. In this case, the target object may be not only an independent three-dimensional object such as a vehicle, a traffic light, a road, and a guardrail, but also an illuminating portion such as a tail lamp, a turn signal, a traffic light that can be specified as a portion of a three-dimensional object. Each later-described functional unit in the embodiment performs processing in response to the update of such image data.

The image processing device 120 obtains image data from each of the two image capturing devices 110, and derives, based on the two pieces of image data, parallax information including a parallax of any block (a set of a predetermined number of pixels) in an image and a position representing a position of the any block in an image. Specifically, the image processing device 120 derives a parallax using so-called pattern matching that searches a block in one of the image data corresponding to the block optionally extracted from the other image data. The block is, for example, an array including four pixels in the horizontal direction and four pixels in the vertical direction. In this embodiment, the horizontal direction means a horizontal direction of the captured image, and corresponds to the wide direction in the real world. On the other hand, the vertical direction means a vertical direction of the captured image, and corresponds to the height direction in the real world.

One way of performing the pattern matching is to compare luminance values (Y color difference signals) between two image data by the block indicating any image position. Examples include an SAD (Sum of Absolute Difference) obtaining a difference of luminance values, an SSD (Sum of Squared intensity Difference) squaring a difference, and an NCC (Normalized Cross Correlation) adopting the degree of similarity of dispersion values obtained by subtracting a mean luminance value from a luminance value of each pixel. The image processing device 120 performs such parallax deriving processing by the block on all the blocks appearing in the detection area (for example, 600 pixels×200 pixels). In this case, the block is assumed to include 4 pixels×4 pixels, but the number of pixels in the block may be set at any value.

Although the image processing device 120 can derive a parallax for each block serving as a detection resolution unit, it is impossible to recognize what kind of target object the block belongs to. Therefore, the parallax information is not derived per target object, but is independently derived per detection resolution unit (for example, per block) in the detection area. In this embodiment, an image obtained by associating the parallax information thus derived (corresponding to a later-described relative distance) with image data is referred to as a distance image.

Figure 2A:
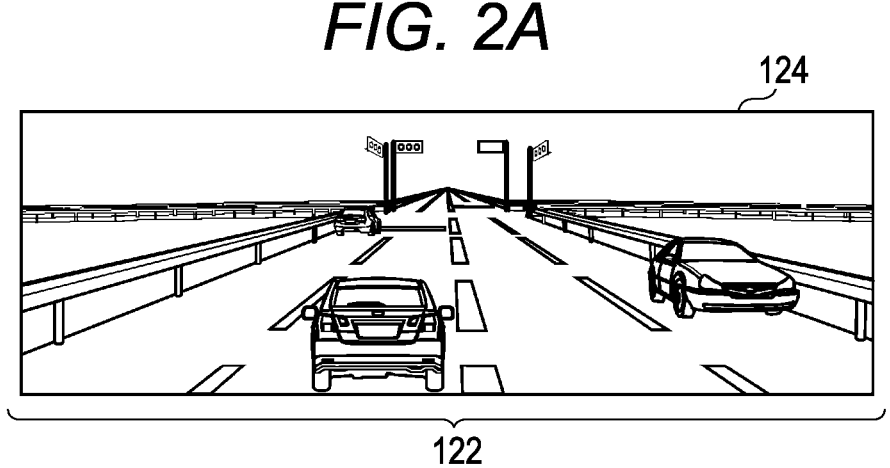
FIGS. 2A and 2B are explanatory diagrams for explaining a luminance image and a distance image.
Figure 2B:
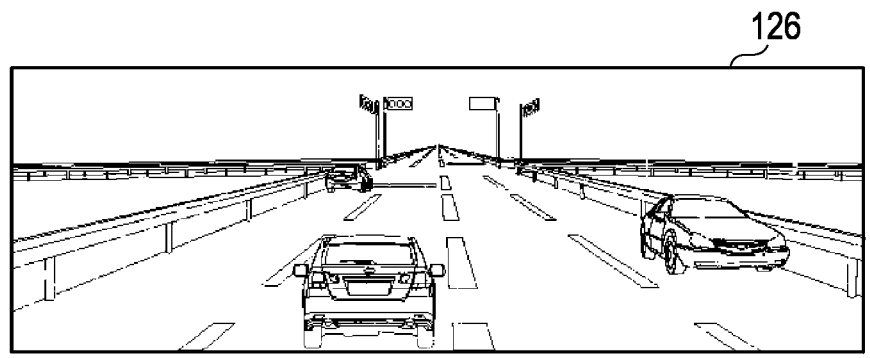

FIGS. 2A and 2B are explanatory diagrams for explaining a luminance image 124 and a distance image 126. For example, Assume that the luminance image (image data) 124 as shown in FIG. 2A is generated with regard to a detection area 122 by the two image capturing devices 110. Here, for the sake of easy understanding, only one of the two luminance images 124 is schematically shown. In the present embodiment, the image processing device 120 obtains a parallax for each block from such luminance image 124, and forms the distance image 126 as shown in FIG. 2B. Each block of the distance image 126 is associated with a parallax of the block. In the drawing, for the sake of explanation, a block of which a parallax is derived is indicated by a black dot.

The parallax can be easily specified at an edge portion (portion where there is a large contrast difference between adjacent pixels) of an image, and therefore, the block from which parallax is derived, which is denoted with black dots in the distance image 126, is likely to also be an edge in the luminance image 124. Therefore, the luminance image 124 as shown in FIG. 2A and the distance image 126 as shown in FIG. 2B are similar in terms of outline of each target object.

The environment recognition device 130 obtains the luminance image 124 and the distance image 126 from the image processing device 120, and uses the luminances based on the luminance image 124 to determine which specific object the target object in the detection area corresponds to. In the present embodiment, specifying accuracy of a target object is improved by performing a white balance correction on the luminance images 124. Further, in order to specify a target object, a relative distance from the vehicle 1 calculated based on the distance image 126 is also used. The environment recognition device 130 uses a so-called stereo method to convert the parallax information for each block in the detection area 122 of the distance image 126 into three-dimensional position information including a relative distance. The stereo method is a method using a triangulation method to derive a relative distance of a target object with respect to the image capturing device 110 from the parallax of the target object. The environment recognition device 130 will be explained later in detail.

The vehicle control device 140 avoids a collision with the target object specified by the environment recognition device 130 and performs control so as to maintain a safe distance from the preceding vehicle. More specifically, the vehicle control device 140 obtains a current cruising state of the vehicle 1 based on, for example, a steering angle sensor 142 for detecting a steering position and a vehicle speed sensor 144 for detecting a speed of the vehicle 1, thereby controlling an actuator 146 to maintain a safe distance from the preceding vehicle. The actuator 146 is an actuator for vehicle control used to control a brake, a throttle valve, a steering angle and the like. When collision with a target object is expected, the vehicle control device 140 displays a warning (notification) of the expected collision on a display 148 provided in front of a driver, and controls the actuator 146 to automatically decelerate the vehicle 1. The vehicle control device 140 can also be integrally formed with the environment recognition device 130.

(Environment Recognition Device 130)

Figure 3:
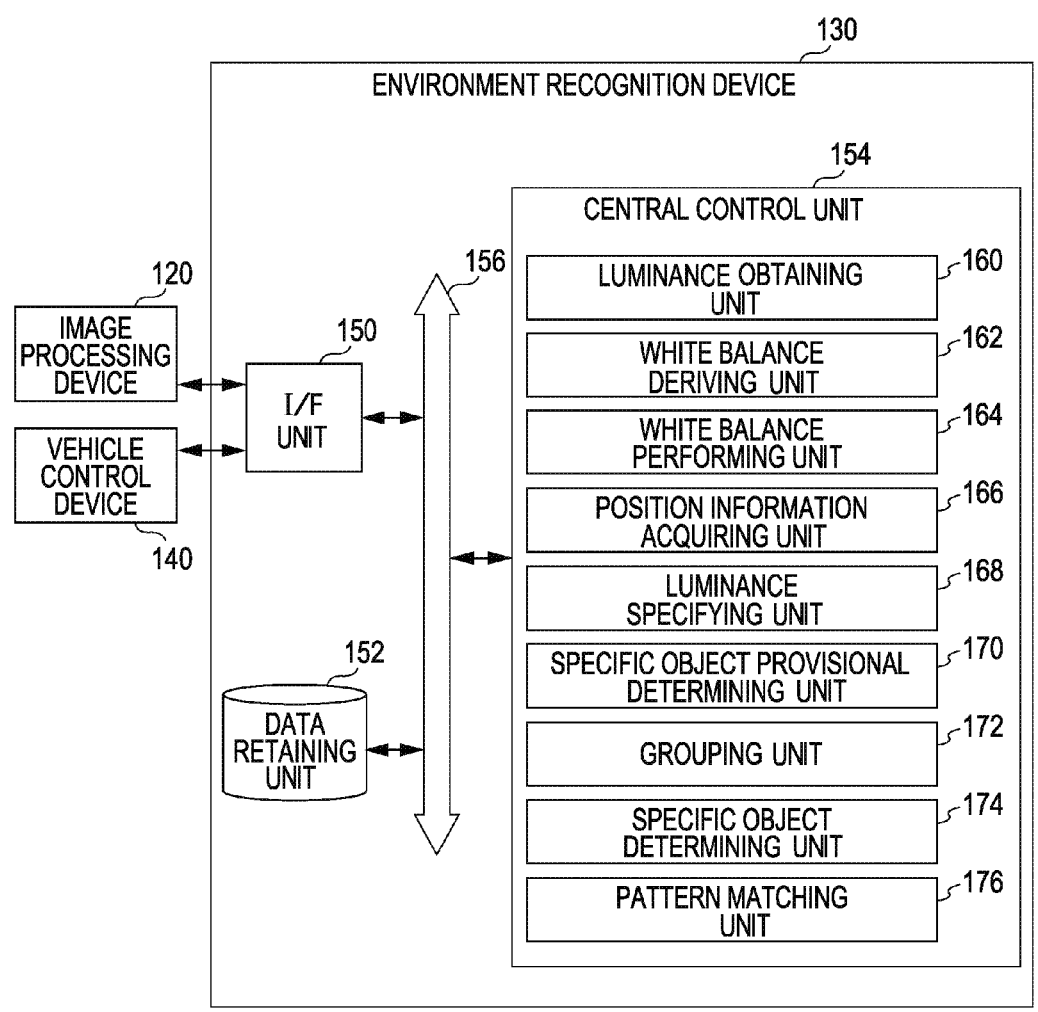
FIG. 3 is a functional block diagram schematically illustrating functions of an environment recognition device.

FIG. 3 is a functional block diagram schematically illustrating functions of an environment recognition device 130. As shown in FIG. 3, the environment recognition device 130 includes an I/F unit 150, a data retaining unit 152, and a central control unit 154.

The I/F unit 150 is an interface for interactive information exchange with the image processing device 120 and the vehicle control device 140. The data retaining unit 152 is constituted by a RAM, a flash memory, an HDD and the like, and retains a specific object table (association) and various kinds of information required for processing performed by each functional unit explained below. In addition, the data retaining unit 152 temporarily retains the luminance image 124 and the distance image 126 received from the image processing device 120. The specific object table is used as follows.

FIG. 4 is an explanatory diagram for explaining a specific object table 200. In the specific object table 200, a plurality of specific objects are associated with a luminance range 202 indicating a range of luminance and a width range 204 indicating a range of size of the specific objects. The specific objects include various objects required to be observed while the vehicle runs on the road, such as "traffic light (red)", "traffic light (yellow)", "traffic light (blue)", "tail lamp (red)", "turn signal (orange)", "road sign (red)", "road sign (blue)", and "road sign (green)". It is to be understood that the specific object is not limited to the objects in FIG. 4. The specific object table 200 defines the order of priority for specifying a specific object, and the environment recognition processing is performed in accordance with the order of priority for each specific object sequentially selected from the plurality of specific objects in the specific object table 200. Among the specific objects, for example, a specific object "traffic light (red)" is associated with luminance (red) "200 or more", luminance (green) "50 or less", luminance (blue) "50 or less", and width range "0.1 to 0.3 m".

In the present embodiment, based on the specific object table 200, a target portion among any target portions in the luminance image 124 is adopted as a candidate for any specific object if the target portion satisfies the condition of a luminance range 202 regarding the specific object. For example, if a luminance of a target portion is included in the luminance range 202 of the specific object "traffic light (red)"

", the target portion is adopted as a candidate for the specific object "traffic light (red)". Then, when the target object made by grouping the target portions is extracted in a form which appears to be a specific object, for example, when the size of a grouped target object is included in the width range "0.1 to 0.3 m" of the "traffic light (red)", it is determined to be a specific object. The target portion determined to be the specific object is labeled with an identification number unique to the specific object. A pixel or a block made by collecting pixels may be used as the target portion, and in the present embodiment, a pixel are used the target portion for the sake of convenience of explanation.

The central control unit 154 is made of a semiconductor integrated circuit including, for example, a central processing unit (CPU), a ROM storing a program and the like, and a RAM serving as a work area, and controls the I/F unit 150, the data retaining unit 152, and the like by way of a system bus 156. In the present embodiment, the central control unit 154 also functions as a luminance obtaining unit 160, a white balance deriving unit 162, a white balance performing unit 164, a position information obtaining unit 166, a luminance specifying unit 168, a specific object provisional determining unit 170, a grouping unit 172, a specific object determining unit 174, and a pattern matching unit 176.

The luminance obtaining unit 160 obtains a luminance by the target portion (pixel) (a luminance consisting of three color phases (red (R), green (G) and blue (B)) per pixel) from the received luminance images 124 according to a control instruction of the white balance performing unit 164 and the specific object provisional determining unit 170 to be described later. Further, after the white balance performing unit 164 to be described later performs a white balance correction, the luminance obtaining unit 160 obtains thus corrected luminances.

The white balance deriving unit 162 reads luminances of a road surface that are previously obtained and retained in the data retaining unit 152, and derives white balance correction values. Then, the derived white balance correction values are retained in the data retaining unit 152.

For example, an object in the luminance image 124 captured by the image capturing devices 110 may have an unnatural color (luminance) depending on an environmental light. At this time, a so-called white balance correction that performs a correction on a white object within the luminance image 124 to appear correctly white. Such a white balance correction is performed, for example, by multiplying white balance correction values (r, g, b) by a luminance in units of phases (R, G, B) (r×R, g×G, b×B) when a target object does not have luminances it is supposed to have, so that the target object can have luminances it is supposed to have. Accordingly, a target object that is referenced for the white balance correction desirably has a relatively large occupying area in an image, and has phase values of a luminance that can be estimated to a certain degree.

For example, the white balance deriving unit 162 derives the white balance correction values such that the luminances of the road surface in the detection area 122 can be recognized as a specific color (for example, gray). Since the environment recognition system 100 is adapted to the vehicle 1, a gray road surface that is a track is more likely to occupy the detection area 122. By thus referencing the road surface, appropriate white balance correction values can be stably derived.

Specifically, the white balance deriving unit 162 calculates a maximum phase value of a luminance representing the road surface, and sets a ratio that causes a phase value different from the color phase selected on the basis of the maximum phase value to be the same value (maximum value) as the white balance correction values. If a luminance of the road surface are (R, G, B)=(150, 200, 180), the white balance deriving unit 162 derives the white balance correction values (r, g, b) that correspond to the maximum value "200" among the three color phases. Here, the white balance correction value of G having the maximum luminance value "200" becomes 1.00, the white balance correction value of R having the luminance "150" becomes 200/150=1.33, and the white balance correction value of B having the luminance "180" becomes 200/180=1.11. Accordingly, the white balance correction values (r, g, b)=(1.33, 1.00, 1.11) are obtained.

Further, as another example, the white balance deriving unit 162 may calculate a second largest phase value of a luminance representing the road surface, and may set a ratio that causes a phase value different from the color phase selected on the basis of the second largest phase value to be the same value (second largest value) as the white balance correction values. In this case, if a luminance of the road surface is (R, G, B)=(150, 200, 180), the white balance deriving unit 162 derives the white balance correction values (r, g, b) that correspond to the second largest value "180" among the three color phases. Accordingly, the white balance correction values (r, g, b)=(1.20, 0.90, 1.00) are obtained. By matching to the intermediate color phase, phase values of a luminance become closer to a center of a set range, and the phase values of the luminance are more likely to be within the set range even if a deflection of the luminance itself is large.

Further, as another example, the white balance deriving unit 162 calculates a minimum phase value of a luminance representing the road surface, and may set a ratio that causes a phase value different from the color phase selected on the basis of the minimum phase value to be the same value (minimum value) as the white balance correction values. In this case, if a luminance of the road surface is (R, G, B)=(150, 200, 180), the white balance deriving unit 162 derives the white balance correction values (r, g, b) that correspond to the minimum value "150" among the three color phases. Accordingly, the white balance correction values (r, g, b)=(1.00, 0.75, 0.83) are obtained. Use of any of the above patterns allows the luminances of the road surface to be corrected to the proper luminances, whereby the specifying accuracy of the target object can be improved.

However, in addition to a typical road with a road surface of asphalt expressed in gray (hereafter referred to simply as "typical road"), there are roads having a different road surface such as a school zone that is colored with green, red, yellow or the like other than gray (hereafter referred to simply as "different color road"). Accordingly, the white balance correction that finely adjusts the road surface of the typical road to gray cannot be adapted to the different color road.

Thus, the present embodiment aims to accurately detect whether the luminance of the road surface is changed due to the environmental light or the coloring of the road surface itself, and realize an appropriate white balance correction. Here, the inventor of the present invention focused on the following point. That is, if the luminance of the road surface is changed due to the environmental light, the environmental light influences the entire detection area 122. As a result not only the luminance of the road surface of the typical road but also the luminance of a predetermined reference portion other than the road surface also changes. On the other hand, in the case of a different color road, the luminance changes only in the different color road. Herein below, a configuration that detects whether the luminance of the road surface is changed due to the environmental light or the coloring of the road surface itself by using a change in the luminance of the road surface and a change in the luminance of the reference portion will be described.

Firstly, the white balance deriving unit 162 reads the luminances of the road surface and the reference portion that are previously obtained, as well as the luminances of the road surface and the reference portion that are obtained before the previous acquisition, which are retained in the data retaining unit 152. Then, the luminances of the road surface and the reference portion obtained before the previous acquisition are subtracted from the luminances of the road surface and the reference portion previously obtained, and thereby deriving a difference value of the luminances of the road surface and a difference value of the luminances of the reference portion.

Next, the white balance deriving unit 162 determines whether or not the difference of the luminances of the road surface is equal to or larger than a first predetermined value while in a state where the difference of the luminances of the reference portion is maintained smaller than a second predetermined value (a state of not having changed by the second predetermined value or more). In this case, if the difference of the luminances of the road surface is equal to or larger than the first predetermined value and the previous luminance of the road surface (luminance after the change) is not a predetermined color (for example. gray (for example, R:G:B=128: 128:128)), that road is determined to be a different color road. Accordingly, the white balance deriving unit 162 maintains the previous white balance correction values (prior to the change) from a point of the change in the luminance of the road surface when the road is determined to be a different color road (accurately, a timing when it is recognized that a change has occurred) until when the luminance of the road surface having returned to the typical road becomes a predetermined color. Such maintaining of the white balance correction values is realized by not updating the white balance correction values retained in the data retaining unit 152.

The reference portion is desirably a target portion that relatively easily appear in the detection area 122; for example, it may be a line restricting a track on the road surface within the detection area 122 (a crosswalk, a center line, a stop line, or a roadside line). An accuracy of the white balance correction becomes higher as a color that is selected to take the balance becomes closer to white. Here, appropriate white balance correction values can be stably derived by referencing the line on the road surface restricting the track that can relatively easily be extracted. Further, such a line restricting the track is likely to appear along with the road surface within the detection area 122, and thus, is suitable for a configuration that requires the luminance of the road surface and the luminance of the reference portion at the same time as in the present embodiment.

Since the road surface is adjacent to the line restricting the track which is the reference portion, the road surface can be extracted as a neighborhood area of the line restricting the track. In so doing, the road surface whose shape is difficult to specify can be specified.

Figure 5A:
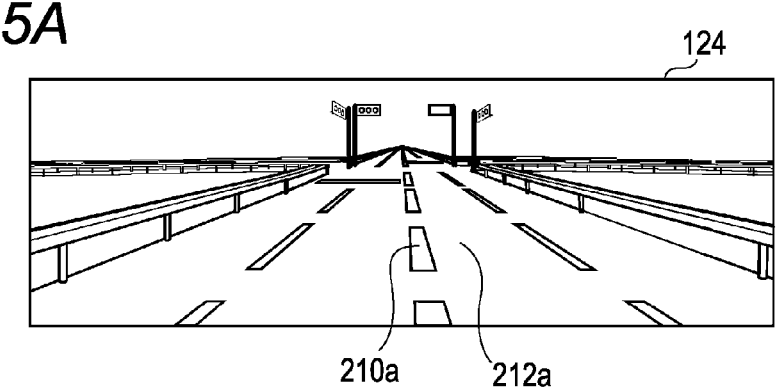
FIGS. 5A to 5D are an explanatory diagrams for explaining a process performed by a white balance deriving unit.

FIGS. 5A to 5D are explanatory diagrams for explaining a process performed by the white balance deriving unit 162. For example, in the case of driving on a typical road as shown in FIG. 5A, the white balance deriving unit 162 reads previous two acquisitions of a luminance of a center line 210a as the reference portion appropriately specified while driving and a luminance of a road surface 212a in a neighborhood area of the center line 210a from the data retaining unit 152. Then, difference values thereof are derived. In the example shown in FIG. 5A, since the luminances of the road surface 212 and the center line 210a are maintained substantially constant, both difference values do not exceed the first and second predetermined values, and the white balance deriving unit 162 recognizes the road as the typical road, and updates the white balance correction values.

Figure 5B:
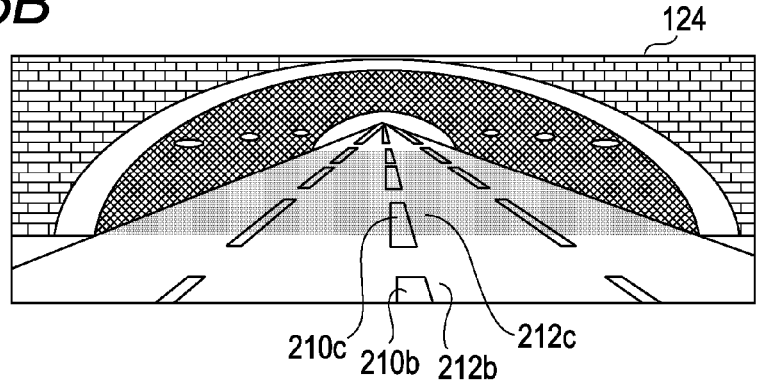

In driving through a tunnel as shown in FIG. 5B, the environmental light changes from the sunlight to an illumination light at around an entrance of the tunnel, and a luminance of a road surface 212b under the sunlight changes to a luminance of a road surface 212c under the illumination light. A difference value in the luminance of the road surface accompanying such a change becomes equal to or larger than the first predetermined value. However, a luminance of a center line 210b under the sunlight also changes to a luminance of a center line 210c under the illumination light, and a difference value therebetween becomes equal to or larger than the second predetermined value. Accordingly, as in the case of the case of FIG. 5A, the white balance deriving unit 162 recognizes the road as the typical road and updates the white balance correction values.

Figure 5C:
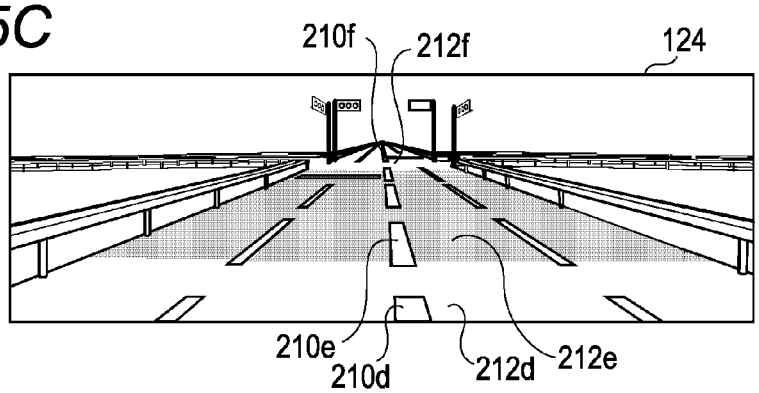

In driving on a different color road as shown in FIG. 5C, upon moving from the road surface 212d of a typical road onto a road surface 212e of a different color road, a luminance of the center line 210d and a luminance of a center line 210e do not change, and thus a difference value of the luminances is maintained smaller than the second predetermined value. On the other hand, a luminance of the road surface 212d and a luminance of the road surface 212e change, and a difference value in the luminance becomes equal to or larger than the first predetermined. Further, the luminance of the road surface 212e after the change is not gray. As a result, the white balance deriving unit 162 determines that the road is a different color road, and stops the update of the white balance correction values. That is, deriving of the white balance correction values is halted, and the previous white balance correction values retained in the data retaining unit 152 are used without any change as the white balance correction values for the current correction.

Further, in FIG. 5C, upon moving from the road surface 212e of the different color road onto the road surface 212f of the typical road, a luminance of the center line 210e and a luminance of a center line 210f do not change, and thus a difference value of the luminances is maintained smaller than the second predetermined value. On the other hand, a luminance of the road surface 212e and a luminance of the road surface 212f change, and a difference value of the luminances becomes equal to or larger than the first predetermined value. However, unlike the shifting from the road surface 212d to the road surface 212e, the luminance of the road surface 212f after the change is gray. When the road surface is determined to be gray, the white balance deriving unit 162 determines that the road is a typical road, and restarts updating of the white balance correction values.

Figure 5D:
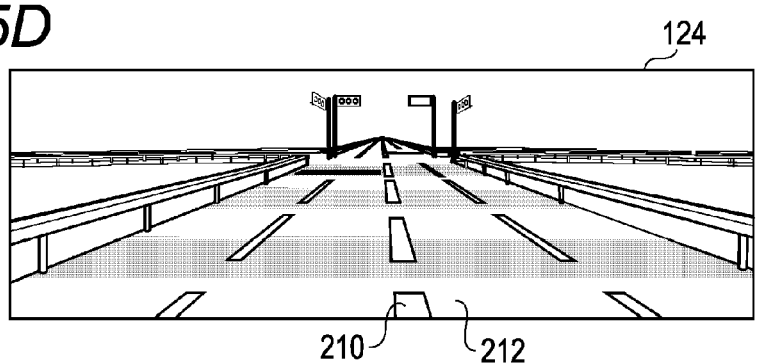

Further, even if the typical road and the different color road are alternately disposed as shown in FIG. 5D, the white balance deriving unit 162 performs a process similar to the process for FIG. 5C. That is, if the change in the luminance of the center line 210 is smaller than the second predetermined value, the change in the luminance of the road surface 212 is equal to or larger than the first predetermined value, and the luminance of the road surface 212 after the change is not gray, the white balance correction values before the change are maintained from the timing of the change until when the luminance of the road surface 212 returns to gray. Since there is a plurality of segments of the different color road, the white balance correction values are maintained for each segment.

In this manner, it is possible to appropriately detect whether the change in the luminance of the road surface 212 is caused by the environmental light with respect to the typical road, or the coloring of the road surface itself as in the case of the different color road by using the change in the luminance of the road surface 212 and the luminance of the reference portion (which herein is the center line 210).

Further, in the present embodiment, as a specific determination method of the change in the luminance, the white balance deriving unit 162 determines that the luminance has changed if a difference between a difference in the color phase selected on the basis of the maximum phase value of the luminances representing the road surface 212 and a difference in the color phase selected on the basis of the minimum phase value of the luminances representing the road surface 212 is equal to or larger than a third predetermined.

For example, assume that the luminance (R, G, B) of the road surface 212 upon the detection before the previous detection is (100, 110, 90) the luminance (R, G, B) of the center line 210 is (190, 210, 200), the luminance (R, G, B) of the road surface 212 upon the previous detection is (90, 110, 100) and the luminance (R, G, B) of the center line 210 is (180, 200, 190). Further, the third predetermined value is determined in advance as "30" with respect to the road surface 212, and "20" with respect to the center line 210.

At this occasion, the color phase having the maximum phase value in the road surface 212 is G, and the difference thereof is |110−110|=0. Further, the color phase having the minimum phase value in the road surface 212 is R (previous detection), and the difference thereof is |90−100|=10. Accordingly, the difference between the difference in the color phase selected on the basis of the maximum phase value and the difference in the color phase selected on the basis of the minimum phase value is |0−10|=10. Further, the color phase having the maximum phase value in the center line 210 is G, and the difference thereof is |200−210|=10. Further, the color phase having the minimum phase value in the center line 210 is R, and the difference thereof is |180−190|=10. Accordingly, the difference between the difference in the color phase selected on the basis of the maximum phase value and the difference in the color phase selected on the basis of the minimum phase value is |10−10|=0.

Here, the difference "10" of the difference values in the color phases that have the maximum phase value and the minimum phase value with respect to the road surface 212 is smaller than the third predetermined value "30", and the difference "0" of the difference values in the color phases that have the maximum phase value and the minimum phase value with respect to the center line 210 is smaller than the third predetermined value "20". Accordingly, the white balance deriving unit 162 determines that no change has occurred in both the road surface 212 and the center line 210, and derives the white balance correction values. Further, although in the above the color phases that have the maximum phase value and the minimum phase value are used due to the reason that a difference tends to occur, the determination may be made based on the difference of the difference values in the color phases that have the maximum phase value and the second largest phase value or that have the minimum phase value and the second smallest phase value.

In this manner, even in the case such as where the luminances of the road surface 212 and the center line 210 slightly change by the sun being clouded, and where the sunlight gradually intensifies or weakens, the white balance correction values can appropriately be derived.

The white balance performing unit 164 derives the corrected luminance by performing the white balance correction using the white balance correction values to the luminance obtained by the luminance obtaining unit 160.

The position information obtaining unit 166 uses the stereo method to convert parallax information for each block in the detection area 122 of the distance image 126 into three-dimensional position information including a horizontal distance x in the wide direction, a height y in the height direction, and a relative distance z in the depth direction according to a control instruction of the specific object provisional determining unit 164 explained later. The parallax information represents a parallax of each target portion in the distance image 126, whereas the three-dimensional position information represents information about the relative distance of each target portion in the real world. Accordingly, a term such as the relative distance and the height refers to a length in the real world, whereas a term such as a detected distance refers to a distance in the distance image 126. When the parallax information is not derived by the pixel but is derived by the block, that is, in units of a plurality of pixels, a calculation may be executed by the pixel with the parallax information being deemed as parallax information about all the pixels which belong to a block.

Figure 6:
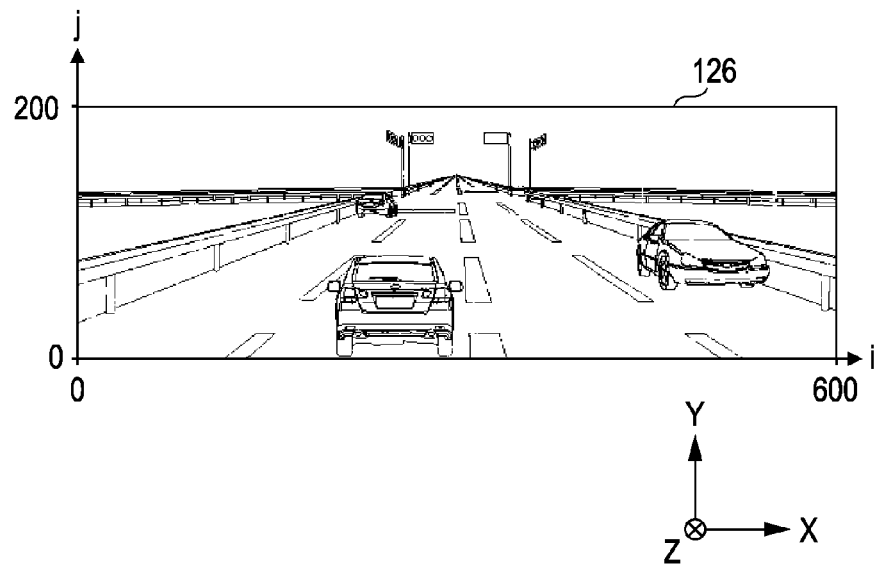
FIG. 6 is an explanatory diagram for explaining conversion into three-dimensional position information performed by a position information obtaining unit.

FIG. 6 is an explanatory diagram for explaining conversion into three-dimensional position information by the position information obtaining unit 166. First, the position information obtaining unit 166 treats the distance image 126 as a coordinate system in units of pixels as shown in FIG. 6. In FIG. 6, the lower left corner is adopted as an origin (0, 0). The horizontal direction is adopted as an i coordinate axis, and the vertical direction is adopted as a j coordinate axis. Therefore, a pixel having a parallax dp can be represented as (i, j, dp) using a pixel position i and j and the parallax dp.

The three-dimensional coordinate system in the real world according to the present embodiment will be considered using a relative coordinate system in which the vehicle 1 is located in the center. In this case, The right side of the direction in which the vehicle 1 moves is denoted as a positive direction of X axis, the upper side of the vehicle 1 is denoted as a positive direction of Y axis, the direction in which the vehicle 1 moves (front side) is denoted as a positive direction of Z axis, and the crossing point between the road surface and the a vertical line passing through the center of two image capturing devices 110 is denoted as an origin (0, 0, 0). At this occasion, When the road is assumed to be a flat plane, the road surface matches the X-Z plane (y=0). The position information obtaining unit 162 uses (formula 1) to (formula 3) shown below to transform the coordinate of the pixel (i, j, dp) in the distance image 126 into a three-dimensional point (x, y, z) in the real world.

$$x = CD/2 + z \times PW \times (i\text{-}IV) \quad \text{(formula 1)}$$

$$y = CH + z \times PW \times (j\text{-}JV) \quad \text{(formula 2)}$$

$$z = KS/dp \quad \text{(formula 3)}$$

Here, CD denotes an interval (baseline length) between the image capturing devices 110, PW denotes a corresponding distance in the real world to a distance between adjacent pixels in the image, so-called like an angle of view per pixel, CH denotes an disposed height of the imaging device 110 from the road surface, IV and JV denote coordinates (pixels) in the image at an infinity point in front of the vehicle 1, and KS denotes a distance coefficient (KS=CD/PW).

Accordingly, the position information obtaining unit 166 derives the height from the road surface on the basis of the relative distance of the target portion and the detection distance in the distance image 126 between a point on the road surface located at the same relative distance as the target portion and the target portion.

The luminance specifying unit 168 extracts the road surface 212 and the center line 210 from among the luminances obtained by the luminance obtaining unit 160 by referencing the three-dimensional coordinate of the target portion by the position information obtaining unit 166, and specifies the luminance of the road surface 212 and the luminance of the center line 210 which is the reference portion. Specifically, the luminance specifying unit 168 firstly extracts the center line 210, and determines the neighborhood region of the center line 210 as the road surface 212. The neighborhood region is at a position that is within a predetermined distance from a position where the luminance of the center line 210 is extracted, and is a position that is close at least regarding the height y. Then, the luminance of the road surface 212 and the luminance of the center line 210 thus specified are retained in the data retaining unit 152 so that they can be used by the white balance deriving unit 162 as previous values, or as values before a previous acquisition.

Further, in the present embodiment, by obtaining the luminances of the road surface 212 and the luminances of the center line 210 within a predetermined first partial area in the detection area 122 at different timings, the changes thereof are derived. However, the present invention is not limited to such a case. For example, the changes can be derived by obtaining the luminances of the road surface 212 and the luminances of the reference portion within each of the predetermined first partial area and a second partial area that is separate from the first partial area in the depth direction z (vertical direction of the image). In this case, since different areas on the same road (the first partial area and the second partial area) can simultaneously be detected, the change in the luminance of the road can be extracted even if the vehicle 1 is stationary. Further, providing a plurality of such a partial area and calculating the change in each area can improve a accuracy of the white balance correction. Furthermore, although the luminance of one target portion is specified for each of the areas of the road surface 212 and the center line 210, but the present invention is not limited to this. It is also possible to evaluate a plurality of target portions around a target portion of the relevant target object, and specify an average value thereof as the luminance. In so doing, a variation in the luminance can be suppressed, whereby the change in the luminance can be determined with high accuracy.

Further, although the luminance specifying unit 168 specifies the luminance for any target portion of an area corresponding to the road surface 212, a range in which the any target portion is set may be a predetermined area that is limited in the vertical direction of a luminance image based on the position of the preceding vehicle or the specific object in front of the vehicle.

Figure 7:
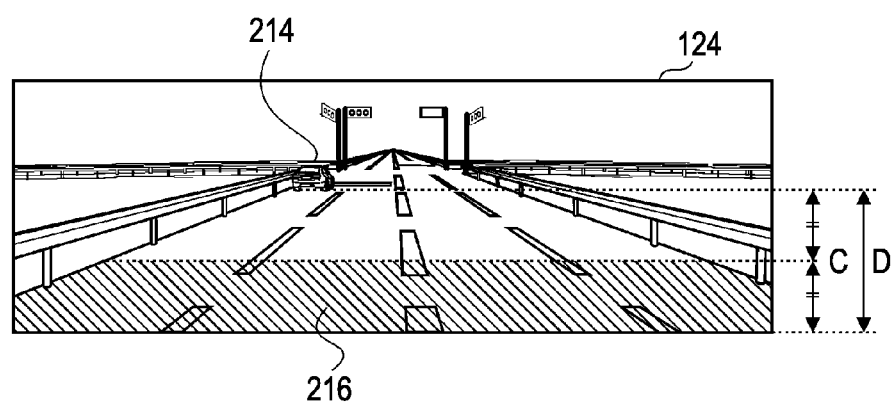
FIG. 7 is an explanatory diagram for explaining an operation of a luminance specifying unit.

FIG. 7 is an explanatory diagram for explaining an operation of the luminance specifying unit 168. In FIG. 7, a predetermined area 216 is set to a cross-hatched area from the subject vehicle 1 (lower end of the detection area) to a center C of a detected distance D between a preceding vehicle 214 and the subject vehicle 1. Accordingly, the luminance specifying unit 168 specifies the luminances of the road surface 212 and the center line 210 within the predetermined area 216.

When neither preceding vehicle nor specific object in front of the vehicle 1 is detected, the predetermined area 216 is set to an area from the lower end of the detection area 122 to a position defined by dividing a distance between the position corresponding to the infinite distance point and the lower end of the detection area 122 by 2. By thus limiting the region for setting the target portion to the predetermined area 216, an erroneous detection of the luminance can be prevented.

On the basis of the specific object table 200 retained in the data retaining unit 152, the specific object provisional determining unit 170 provisionally determines a specific object corresponding to the target object using the luminances of the target object to which the white balance performing unit 164 has performed the white balance correction.

More specifically, the specific object provisional determining unit 170 firstly causes the luminance obtaining unit 160 to obtain the corrected luminance of any given target portion in the luminance image 124. Subsequently, the specific object provisional determining unit 170 sequentially selects any specific object from the specific objects registered in the specific object table 200, and determines whether the luminance of the target portion of one obtained target object is included in the luminance range 202 of the specific object sequentially selected. Then, the luminance is determined to be in the selected luminance range 202, an identification number representing the selected specific object is given to the target portion, and a specific object map is generated.

The specific object provisional determining unit 170 sequentially executes a series of comparisons between the corrected luminance of the target portion and the luminance range 202 of the specific objects registered in the specific object table 200. The order selecting the specific objects in the specific object table 200 as explained above also shows the order of priority. That is, in the example of the specific object table 200 of FIG. 4, the comparison processing is executed in the following order: "traffic light (red)", "traffic light (yellow)", "traffic light (blue)", "tail lamp (red)", "turn signal (orange)", "road sign (red)", "road sign (blue)", and "road sign (green)".

When the comparison is made according to the above order of priority, and as a result, the corrected luminance of the target portion is determined to be included in the luminance range 202 of a specific object of a high order of priority, the comparison processing is no longer performed for specific objects of a lower order of priority. Therefore, one target portion is given only at most one identification number representing one specific object. This is because a plurality of specific objects do not overlap in the real world, and thus a target object that is once determined to be any given specific object is no longer determined to be another specific object. By exclusively treating the target portions in this manner, it is possible to avoid redundant specifying processing for the same target portion that is already provisionally determined to be a specific object, and the processing load can be reduced.

Figure 8:
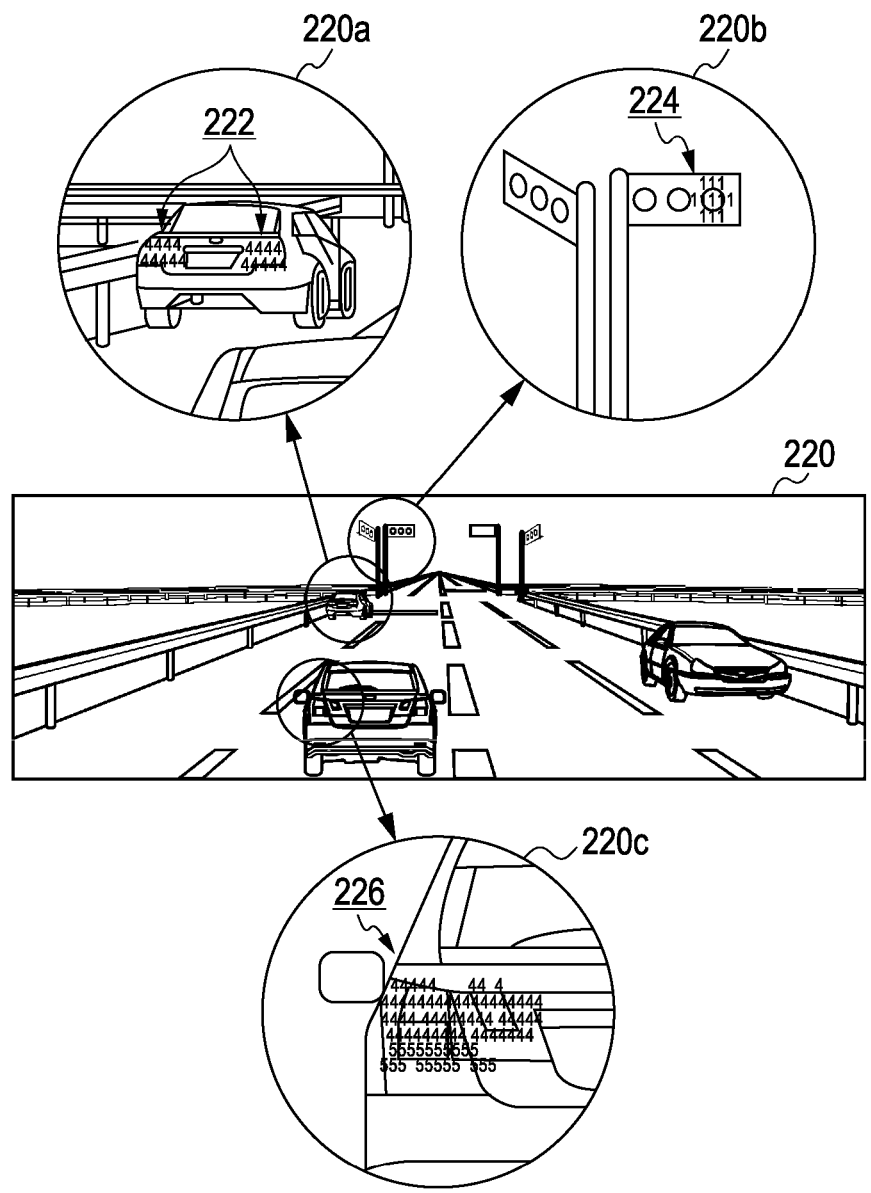
FIG. 8 is an explanatory diagram for explaining a specific object map.

FIG. 8 is an explanatory diagram for explaining a specific object map 220. The specific object map 220 is made by overlaying the identification numbers of the specific objects on the luminance image 124, and the identification number of the specific object is associated with a position corresponding to the target portion provisionally determined to be the specific object.

For example, in a segment map 220a of the specific object map 220, the corrected luminances of target portions 222 corresponding to the tail lamps of the preceding vehicle are compared with the luminance range 202 of the specific objects "traffic light (red)", "traffic light (yellow)", and "traffic light (blue)" in order, and finally, an identification number "4" of the specific object "tail lamp (red)" is associated. In a segment map 220b of the specific object map 220, the corrected luminances of target portions 224 corresponding to the light-emitting portions at the right side of the traffic light are included in the luminance range 202 of the specific object "traffic light (red)", and therefore, an identification number "1" of the specific object "traffic light (red)" is associated. Further, in a segment map 220c of the specific object map 220, the corrected luminances of target portions 226 corresponding to the back surface lamp portion of the preceding vehicle are compared with the luminance range 202 of each of the specific objects "traffic light (red)", "traffic light (yellow)", and "traffic light (blue)" in order, and finally, an identification number "4" of the specific object "tail lamp (red)" and an identification number "5" of the specific object "turn signal (orange)" are associated. FIG. 8 shows a figure in which identification numbers are given to target portions of the luminance image 124. This is, however, a conceptual representation for the sake of easy understanding. In reality, identification numbers are registered as data at target portions.

The grouping unit 172 adopts any given target portion provisionally determined as a base point, and groups the relevant target portions, which are provisionally determined to correspond to a same specific object (attached with a same identification number) and between which differences in the width direction x and the height direction y are within a predetermined range, into a target object. The predetermined range is represented as a distance in the real world, and can be set at any given value (for example, 1.0 m). The grouping unit 172 adopts the target portion newly added through the grouping processing as a base point, and groups the relevant target portions, which are provisionally determined to correspond to a same specific object and between which differences in the width direction x and the height direction y are within a predetermined range. Consequently, as long as distances between target portions provisionally determined to be the same specific object are within the predetermined range, all of such target portions are grouped.

In this case, the grouping unit 172 makes the determination using the distances in the wide direction x and the height direction y in the real world, but when a determination is made using the detection distances in the luminance image 124 and the distance image 126, the threshold value of the predetermined range for grouping is changed according to the relative distance of the target portion. As shown in FIG. 2 and the like, distant objects and close objects are represented in the flat plane in the luminance image 124 and the distance image 126, and therefore, an object located at a distant position is represented in a small (short) size and an object located at a close position is represented in a large (long) size. Therefore, for example, the threshold value of the predetermined range in the luminance image 124 and the distance image 126 is set at a small value for a distant target portion, and set at a large value for a close target portion. Therefore, even when the detection distances are different between a distant position and a close position, the grouping processing can be stably performed.

In addition to the difference in the wide direction x and the difference in the height direction y explained above, the grouping unit 172 may group the relevant target portions, between which differences in depth direction z are within a predetermined range and which are provisionally determined to correspond to a same specific object. In the real world, even when target portions are close to each other in the width direction x and in the height direction y, the relative distance in the depth direction z thereof may be greatly different. In such case, the target portions belong to different target objects. Therefore, when any one of the difference in the width direction x, the difference in the height direction y, and the difference in the depth direction z is greatly different, the group of the target portions may be deemed as an independent target object. In so doing, it is possible to perform highly accurate grouping processing.

In the above description, each of the difference in the width direction x, the difference in the height direction y, and the difference in the depth direction z is independently determined, and only when all of them are included within the predetermined range, the target portions are grouped into a same group. However, grouping processing may be performed using another calculation. For example, when Euclidean distance, square root of ((difference in the width direction x)$^2$+(difference in the height direction y)$^2$+(difference in the depth direction z)$^2$), is included within a predetermined range, target portions may be grouped into a same group. With such calculation, distances between target portions in the real world can be derived accurately, and therefore, grouping accuracy can be enhanced.

When a target object made as a result of grouping processing by the grouping unit 172 satisfies a predetermined condition, the specific object determining unit 174 determines that the target object is a specific object. For example, as shown in FIG. 4, when the width range 204 is associated with the specific object table 200, and the size of a target object (both the wide distance x and the height distance y of the target object) is included in the width range 204 of a specific object provisionally determined with regard to the target object on the basis of the specific object table 200, the specific object determining unit 174 determines the target object as the specific object. A separate width range 204 may be set for each of the wide distance x and the height distance y. Here, it is examined whether the target object is of a size adequate to be deemed as a specific object. Therefore, when the size of the target object is not included in the width range 204, the target object can be excluded as information unnecessary for the environment recognition processing.

As a result, the environment recognition device 130 can extract, from the luminance image 124, one or more target objects as specific objects, and the information can be used for various kinds of control. For example, when the specific object "traffic light (red)" is extracted, this indicates that the target object is a fixed object that does not move, and when the target object is a traffic light for the lane of the vehicle 1, this indicates that the vehicle 1 has to stop or decelerate. When the specific object "tail lamp (red)" is extracted, this indicates that there is a preceding vehicle travelling together with the vehicle 1 and that the back surface of the preceding vehicle is at the relative distance of the specific object "tail lamp (red)".

When a specific object determined by the specific object determining unit 174 is, for example, a "sign" and it is assumed that the specific object indicates a speed limit, the pattern matching unit 176 further executes pattern matching for a numerical value indicated therein, and specifies the numerical value. In this manner, the environment recognition device 130 can recognize the speed limit and the like of the traffic lane in which the subject vehicle is travelling.

In the present embodiment, the specific object determining unit 174 firstly extracts a plurality of limited specific objects, and then only has to perform the pattern matching only on the extracted specific objects. Therefore, in contrast to the conventional case where pattern matching is performed on the entire surface of the luminance image 124, the processing load is significantly reduced.

(Environment Recognition Method)

Figure 9:
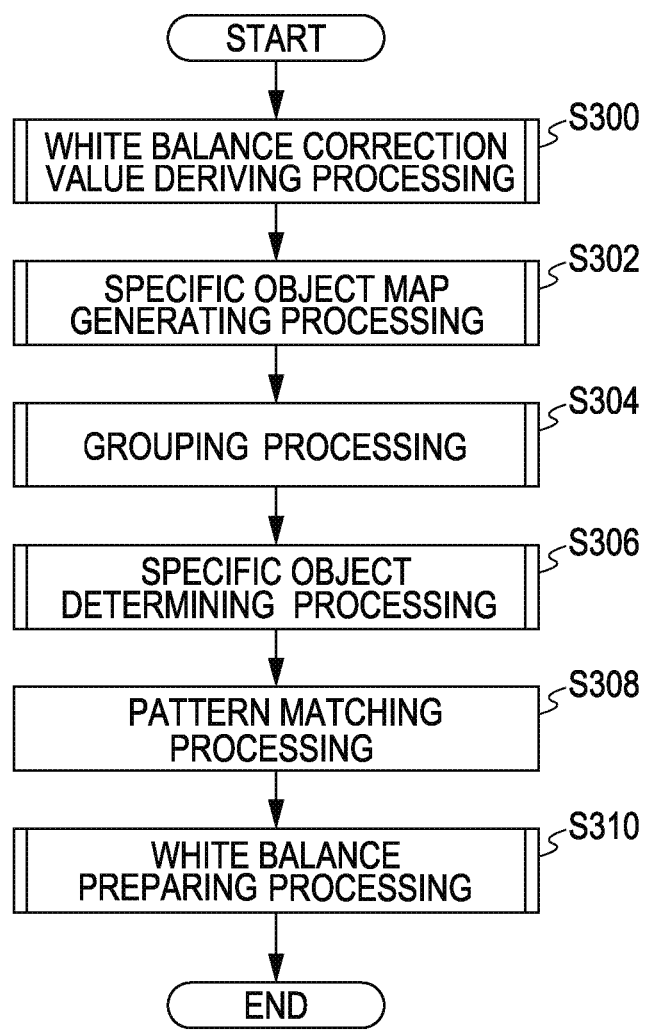
FIG. 9 is a flowchart illustrating an overall flow of an environment recognition method.

Hereinafter, specific processing performed by the environment recognition device 130 will be explained based on the flowchart shown in FIGS. 9 to 14. FIG. 9 illustrates an overall flow of interrupt processing when the image processing device 120 transmits the distance image (parallax information) 126. FIGS. 10 to 14 illustrate subroutines therein. In this description, pixels are used as target portions, and the lower left corners of the luminance image 124 and the distance image 126 are origins. The processing is performed according to the environment recognition method in a range of 1 to 600 pixels in the horizontal direction of the image and 1 to 200 pixels in the vertical direction of the image. In this description, the number of specific objects to be checked is assumed to be eight. Further, an example that uses the center line 210 as the reference portion is described.

As shown in FIG. 9, when an interrupt occurs according to the environment recognition method in response to reception of the distance image 126, white balance correction values are derived so that the luminance of the road surface can be recognized as a predetermined color (gray) (S300). Then, the luminance image 124 obtained from the image processing device 120 is corrected with the white balance correction values and referred to, and a specific object map 220 is generated (S302). Subsequently, the specific objects provisionally determined are made into a group (S304), and the grouped target objects are determined as a specific object (S306). If it is necessary to further obtain information from the specific object thus determined, the pattern matching unit 170 executes the pattern matching on the specific object (S308), and the specific object determining unit 168 determines the luminances of the road surface 212 and the center line 210 for next white balance correction value deriving processing S300 (S310). Hereinafter, the above processing will be explained more specifically.

(White Balance Correction Value Deriving Processing S300)

Figure 10:
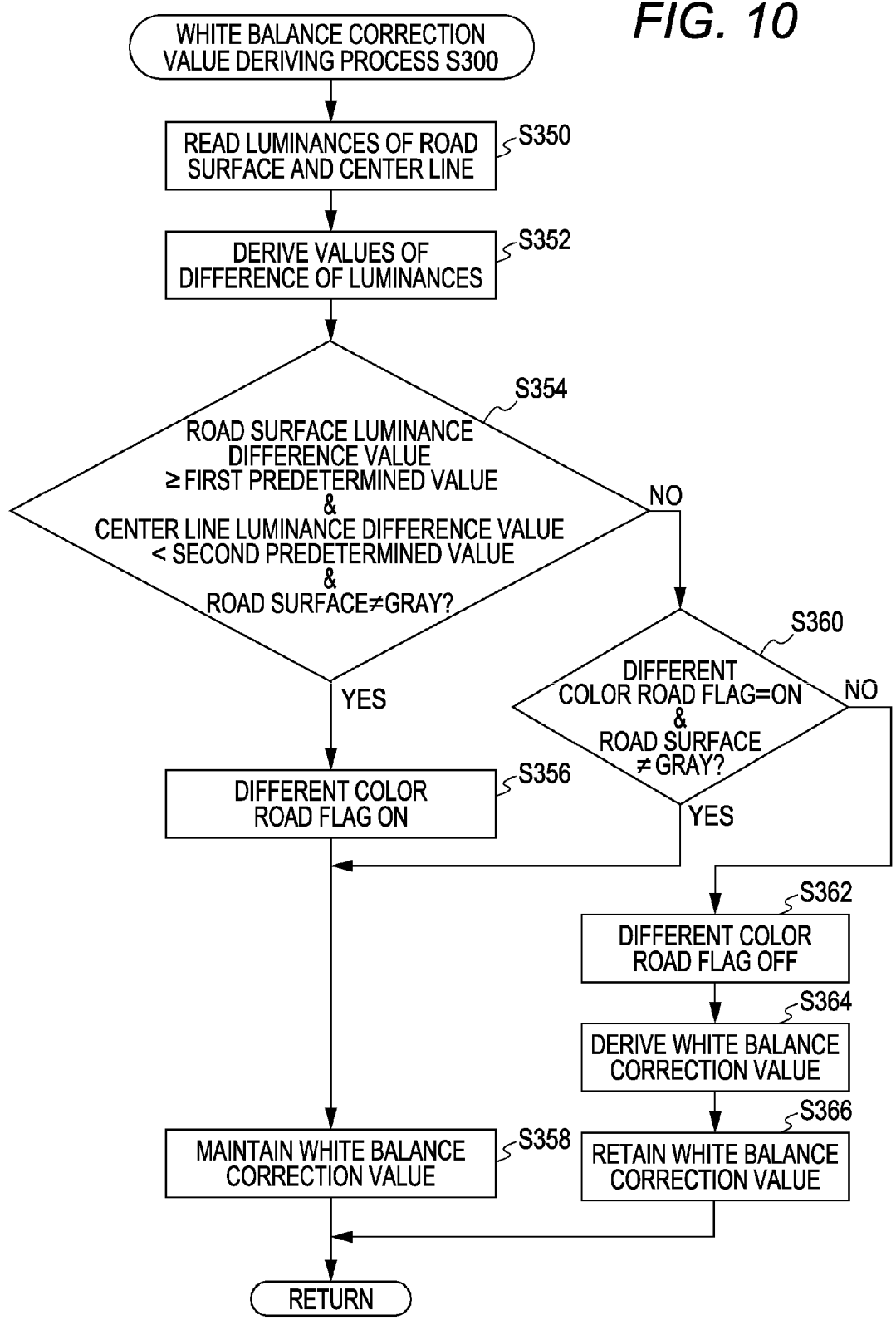
FIG. 10 is a flowchart illustrating flow of a white balance correction value deriving processing.

As shown in FIG. 10, the white balance deriving unit 162 firstly reads out from the data retaining unit 152 a luminance of the road surface 212 and a luminance of the center line 210 that have been previously obtained, and also a luminance of the road surface 212 and a luminance of the center line 210 obtained before the previous acquisition (S350). Then, the luminance of the road surface 212 and the luminance of the center line 210 obtained before the previous acquisition are subtracted from the luminance of the road surface 212 and the luminance of the center line 210 that have been previously obtained, and a difference value of the luminances of the road surface 212 and a difference value of the luminances of the center line 210 are derived (S352).

Next, the white balance deriving unit 162 determines whether or not the difference value of the luminances of the road surface 212 is equal to or larger than the first predetermined value, the difference value of the luminances of the center line 210 is smaller than the second predetermined value, and the previous luminance of the road surface 212 is not the predetermined color (for example, gray) (S354). If the difference value of the luminances of the road surface 212 is equal to or larger than the first predetermined value, the difference value of the luminances of the center line 210 is smaller than the second predetermined value, and the previous luminance of the road surface 212 is not the predetermined color (for example, gray) (YES to S354), the white balance deriving unit 162 turns ON a different color road flag (S356), and maintains the previous white balance correction values (S358). The different color road flag is a flag indicating the road is a different color road, and is kept until the road returns to a typical road after having shifted to the different color road.

If any one of the conditions that the difference value of the luminances of the road surface 212 is equal to or larger than the first predetermined value, the difference value of the luminances of the center line 210 is smaller than the second predetermined value, and the previous luminance of the road surface 212 is not the predetermined color (for example, gray) is not satisfied (NO in S354), it is determined whether or not the different color road flag is ON and the previous luminance of the road surface 212 is not the predetermined color (for example, gray) (S360). If the different color road flag is ON and the previous luminance of the road surface 212 is not the predetermined color (for example, gray) (YES in S360), the white balance deriving unit 162 recognizes that the different color road is continuing, and maintains the previous white balance correction values (S358). That is, the white balance correction values retained in the data retaining unit 152 are not updated.

If the condition that the different color road flag is ON and the previous luminance of the road surface 212 is not the predetermined color (for example, gray) is not satisfied (NO in S360), it is determined to have shifted to a typical road, and the different color road flag is turned OFF (S362). Then, the white balance deriving unit 162 reads out from the data retaining unit 152 the previously obtained luminance of road surface 212, and derives white balance correction values (S364). For example, the white balance deriving unit 162 obtains a maximum phase value of the luminance representing the road surface 212, and sets a ratio that causes a phase value different from the color phase selected on the basis of the maximum phase value to be the maximum value as white balance correction values. Then, the derived white balance correction values are retained in the data retaining unit 152 (S366).

(Specific Object Map Generating Processing S302)

Figure 11:
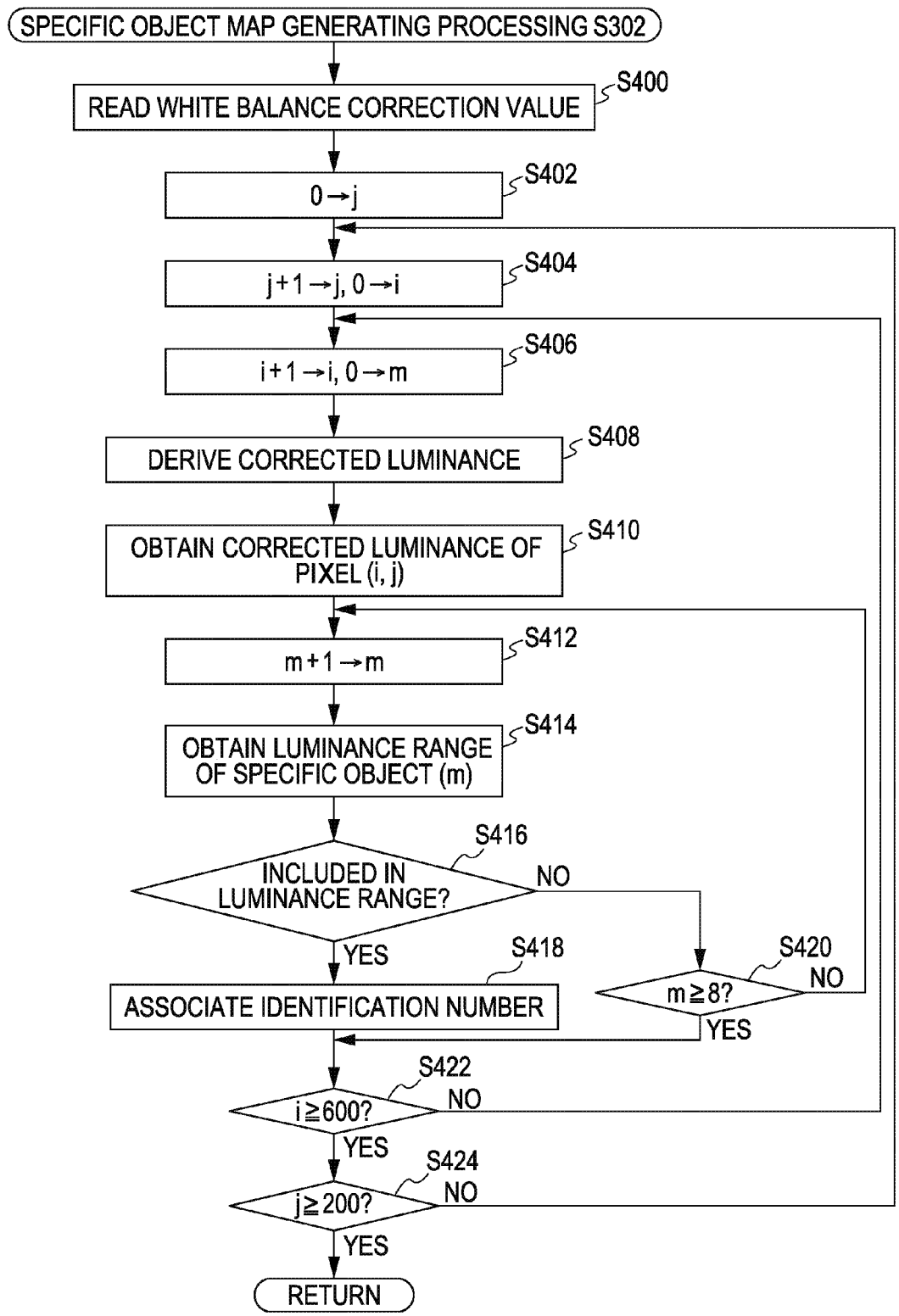
FIG. 11 is a flowchart illustrating a flow of specific object map generating processing.

As shown in FIG. 11, the white balance performing unit 164 reads the white balance correction values derived by the white balance deriving unit 162 from the data retaining unit 152 (S400). The specific object provisional determining unit 170 initializes (substitutes "0" to) a vertical variable j for specifying a target portion (pixel) (S402). Then, the specific object provisional determining unit 170 adds (increments) "1" to the vertical variable j while initializing (substituting "0" to) a horizontal variable (S404). Then, the specific object provisional determining unit 164 adds "1" to the horizontal variable i, and initializes (substitutes "0" to) a specific object variable m (S406). Here, the horizontal variable i and the vertical variable j are provided to execute the specific object map generating processing on all of the 600×200 pixels, and the specific object variable m is provided to sequentially compare eight specific objects for each pixel.

Then, the white balance performing unit 164 performs the white balance correction using the white balance correction values to the luminance obtained by the luminance obtaining unit 160, and derives the corrected luminance (S408).

The specific object provisional determining unit 170 causes the luminance obtaining unit 160 to obtain corrected luminance of a pixel (i, j) as a target portion from the luminance image 124 (S410), adds "1" to the specific object variable m (S412), obtains the luminance range 202 of the specific object (m) (S414), and determines whether or not the luminance of the pixel (i, j) is included in the luminance range 202 of the specific object (m) (S416).

When the corrected luminance of the pixel (i, j) is included in the luminance range 202 of the specific object (m) (YES in S416), the specific object provisional determining unit 164 associates an identification number p representing the specific object (m) with the pixel, so as to be expressed as a pixel (i, j, p) (S418). In this manner, the specific object map 210 is generated, in which a identification number is given to each pixel in the luminance image 124. When the luminance of the pixel (i, j) is not included in the luminance range 202 of the specific object (m) (NO in S416), a determination is made as to whether or not the specific object variable m is more than 8 which is the maximum number of specific objects (S420). When the specific object variable m is less than the maximum value (NO in S420), the processings are repeated from the increment processing of the specific object variable m in step S412. When the specific object variable m is equal to or more than the maximum value (YES in S420), which means that there is no specific object corresponding to the pixel (i, j), the processing in step S422 subsequent thereto is performed.

Then, the specific object provisional determining unit 170 determines whether or not the horizontal variable i is more than 600 which is the maximum value of horizontal pixel (S422), and when the horizontal variable i is less than the maximum value (NO in S422), the processings are repeated from the increment processing of the horizontal variable i in step S406. When the horizontal variable i is equal to or more than the maximum value (YES in S422), the specific object provisional determining unit 164 determines whether or not the vertical variable j is equal to or more than 200 which is the maximum value of vertical pixel (S424). Then, when the vertical variable j is less than the maximum value (NO in S424), the processings are repeated from the increment processing of the vertical variable j in step S404. When the vertical variable j is equal to or more than the maximum value (YES in S424), the specific object map generating processing is terminated. In this manner, the specific object corresponding to each pixel is provisionally determined. (Grouping Processing S304)

Figure 12:
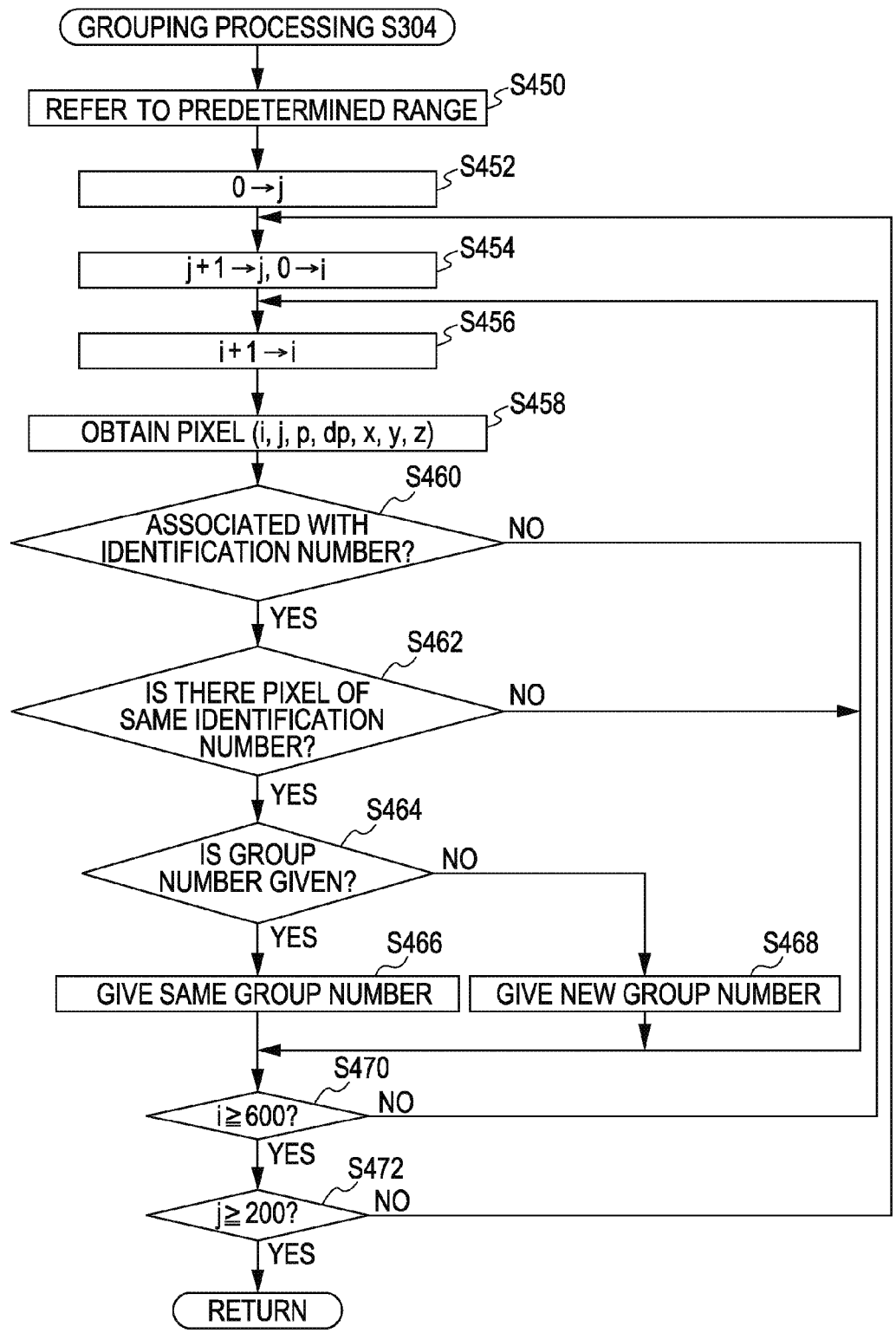
FIG. 12 is a flowchart illustrating a flow of grouping processing.

As shown in FIG. 12, the grouping unit 172 refers to a predetermined range to group target portions (S450), and initializes (substitutes "0" to) the vertical variable j for specifying a target portion (pixel) (S452). Subsequently, the grouping unit 172 adds "1" to the vertical variable j, and initializes (substitutes "0" to) the horizontal variable (S454). Then, the grouping unit 172 adds "1" to the horizontal variable i (S456).

The grouping unit 172 obtains a pixel (i, j, p, dp, x, y, z) as the target portion from the luminance image 124 (S458). Then, a determination is made as to whether an identification number p of the specific object is associated with the pixel (i, j, p, dp, x, y, z) (S460). When the identification number p is associated (YES in S460), the grouping unit 166 determines whether or not there is another pixel (i, j, p, dp, x, y, z) associated with the same identification number p in a predetermined range from the coordinates (x, y, z) in the real world corresponding to the pixel (i, j, p, dp, x, y, z) (S462).

When there is another pixel (i, j, p, dp, x, y, z) associated with the same identification number (YES in S462), the grouping unit 172 determines whether a group number g is given to any of all the pixels in the predetermined range including the pixel under determination (S464). When the group number g is given to any of them (YES in S464), the grouping unit 172 gives a value to all of the pixels included in the predetermined range and all of the pixels to which the same group number g is given, the value being a smaller one of the smallest group number g among the group numbers given thereto or the smallest value of numbers that have not yet used as a group number, so as to expressed as a pixel (i, j, p, dp, x, y, z, g) (S466). When the group number g is given to none of them (NO in S464), the smallest value of numbers that have not yet used as a group number is newly given to all the pixels in the predetermined range including the pixel under determination (S468).

In this manner, when there is a plurality of target portions that have a same identification number in the predetermined range, grouping process is performed by giving one group number g. If a group number g is given to none of the plurality of target portions, a new group number g is given, and if a group number g is already given to any one of them, the same group number g is given to the other target portions. However, when there is a plurality of group numbers g in the plurality of target portions, the group numbers g of all the target portions are replaced with one group number g so as to treat the target portions as one group.

In the above description, the group numbers g of not only all the pixels included in the predetermined range but also all the pixels to which the same group number g is given are changed at a time. The primary reason for this is to avoid dividing the group already unified by changing of the group numbers g. In addition, a smaller one of the smallest group number g or the smallest value of numbers that have not yet used as a group number is employed in order to avoid making a skipped number as much as possible upon group numbering. In so doing, the maximum value of the group number g does not become unnecessarily large, and the processing load can be reduced.

When an identification number p is not associated (NO in S460), or when there is no other pixel that has the identification number p (NO in S462), the processing in step S470 subsequent thereto is performed.

Subsequently, the grouping unit 172 determines whether or not the horizontal variable i is equal to or more than 600 which is the maximum value of pixel number in the horizontal direction (S470). When the horizontal variable i is less than the maximum value (NO in S470), the processings are repeated from the increment processing of the horizontal variable i in step S456. When the horizontal variable i is equal to or more than the maximum value (YES in S470), the grouping unit 172 determines whether or not the vertical variable j is equal to or more than 200 which is the maximum value of pixel number in the vertical direction (S472). When the vertical variable j is less than the maximum value (NO in S472), the processings are repeated from the increment processing of the vertical variable j in step S454. When the vertical variable j is equal to or more than the maximum value (YES in S472), the grouping processing is terminated.

(Specific Object Determining Processing S306)

Figure 13:
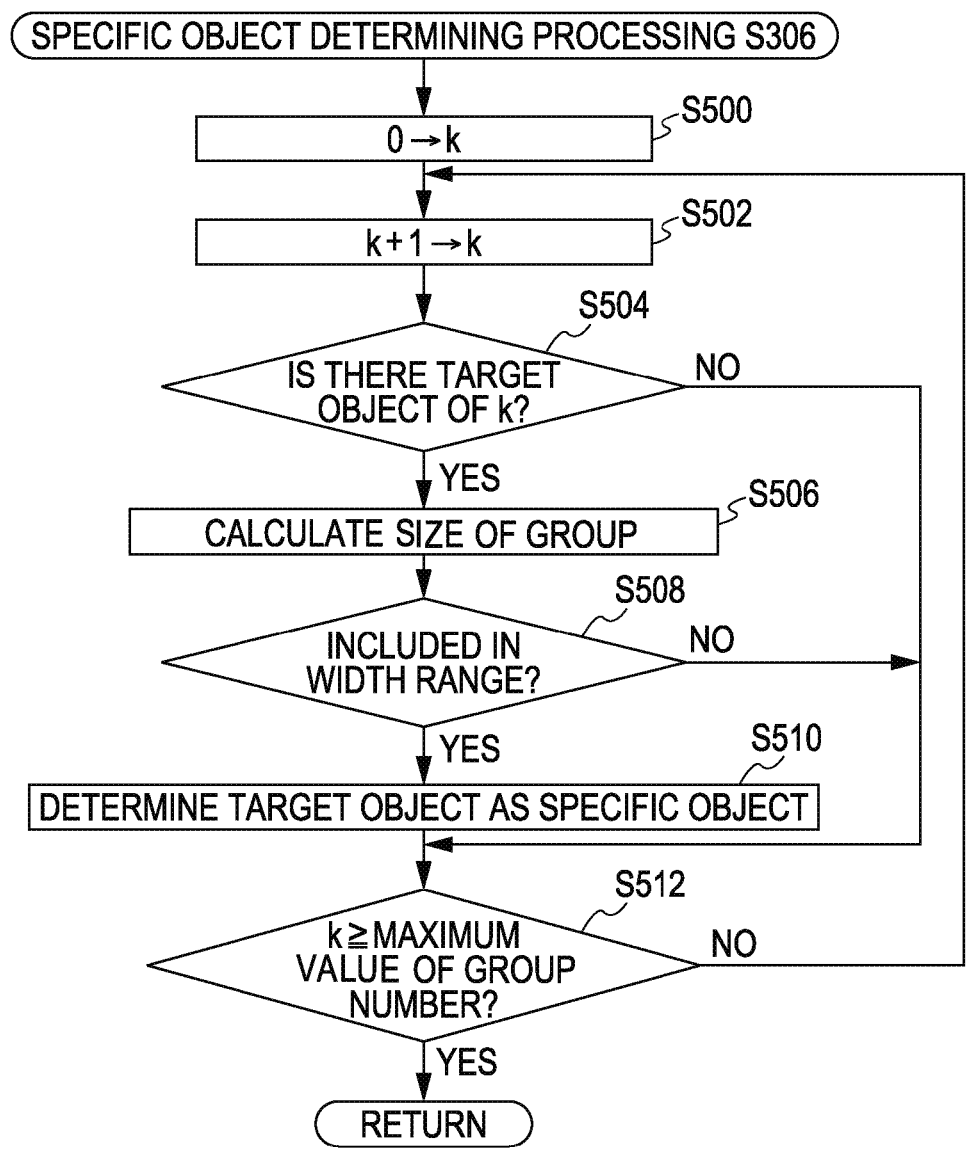
FIG. 13 is a flowchart illustrating a flow of specific object determining processing.

As shown in FIG. 13, the specific object determining unit 174 initializes (substitutes "0" to) a group variable k for specifying a group (S500). Subsequently, the specific object determining unit 174 adds "1" to the group variable k (S502). The specific object determining unit 174 determines whether or not there is a target object of which group number g is the group variable k from the luminance image 124 (S504). When there is such target object (YES in S504), the specific object determining unit 174 calculates the size of the target object to which the group number g is given (S506). Then, a determination is made as to whether or not the calculated size is included in the width range 206 of a specific object represented by the identification number p associated with the target object of which group number g is the group variable k (S508).

When the size is included in the width range 204 of the specific object represented by the identification number p (YES in S508), the specific object determining unit 168 determines that the target object is the specific object (S510). When the size is not included in the width range 204 of the specific object represented by the identification number p (NO in S508), or, when there is no target object of which group number g is the group variable k (NO in S504), the processing in step S512 subsequent thereto is performed.

Subsequently, the specific object determining unit 174 determines whether or not the group variable k is equal to or more than the maximum value of group number set in the grouping processing (S512). Then, when the group variable k is less than the maximum value (NO in S512), the processings are repeated from the increment processing of the group variable k in step S502. When the group variable k is equal to or more than the maximum value (YES in S512), the specific object determining processing is terminated. As a result, the grouped target objects are formally determined to be the specific object.

(White Balance Preparing Processing S310)

Figure 14:
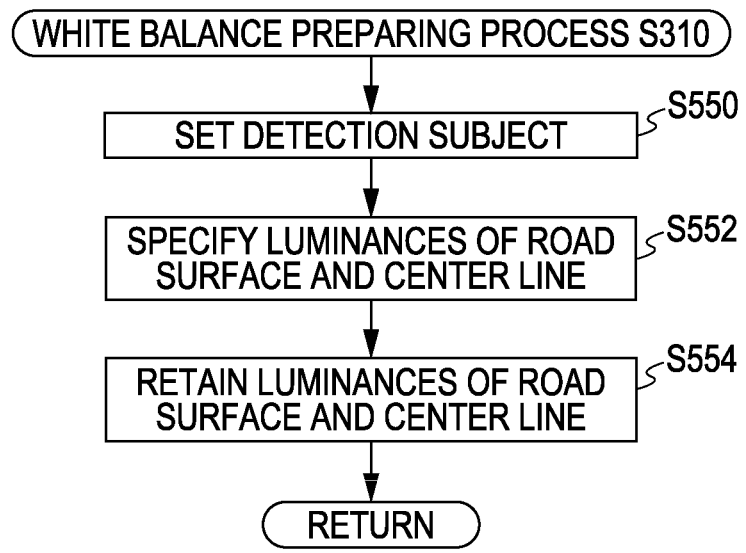
FIG. 14 is a flowchart showing a flow of white balance preparing processing.

As shown in FIG. 14, the luminance identifying unit 168 derives a predetermined area 216 limited in the vertical direction based on the position of a preceding vehicle or a specific object in front of the vehicle 1, and sets any target portion of the road surface 212 in the predetermined area 216 as a target object for detection (S550). Then, the luminance specifying unit 168 references the relative distance of the target portion obtained by the position information obtaining unit 166, extracts the road surface 212 and the center line 210 based on the luminances obtained by the luminance obtained unit 160, and specifies the luminances of the road surface 212 and the luminances of the center line 210 which is the reference portion (S552). Then, the specified luminance of the road surface 212 and the luminance of the center line 210 are retained in the data retaining unit 152 for a future use by the white balance deriving unit 162 (S554).

As described above, according to the environment recognition device 130, a highly accurate detection is performed as to whether the road surface changes in luminance due to the environmental light or the coloring of the road surface 212 itself, and it is possible to perform the white balance correction appropriately without accompanying response delay.

In addition, a program for allowing a computer to function as the environment recognition device 130 is also provided as well as a storage medium such as a computer-readable flexible disk, a magneto-optical disk, a ROM, a CD, a DVD, a BD storing the program. Here, the program means a data processing function described in any language or description method.

While a preferred embodiment of the present invention has been described hereinabove with reference to the appended drawings, it is to be understood that the present invention is not limited to such embodiment. It will be apparent to those skilled in the art that various changes may be made without departing from the scope of the invention.

In the above embodiment, an example is shown in which, firstly, the corrected luminance of a target portion is exclusively associated with any one of specific objects, and then a determination is made as to whether the height and the size of a target object made by grouping the target portions are appropriate for the specific object or not. However, the present invention is not limited to this. A determination can be made based on any one of the specific object, the corrected luminance, the height, and the size, and the order of determinations may be defined in any order.

In the above embodiment, the three-dimensional position of the target object is derived based on the parallax between image data using the plurality of image capturing devices 110. However, the present invention is not limited to such case. Alternatively, for example, a variety of known distance measuring devices such as a laser radar distance measuring device may be used. In this case, the laser radar distance measuring device emits laser beam to the detection area 122, receives light reflected when the laser beam is irradiated the object, and measures the distance to the object based on the time required for this event.

The above embodiment describes an example in which the position information obtaining unit 166 receives the distance image (parallax information) 126 from the image processing device 120, and generates the three-dimensional position information. However, the present invention is not limited to such case. The image processing device 120 may generate the three-dimensional position information in advance, and the position information obtaining unit 166 may obtain the generated three-dimensional position information. Such a functional distribution can reduce the processing load of the environment recognition device 130.

In the above embodiment, the luminance obtain unit 160, the white balance deriving unit 162, the white balance performing unit 164, the position information obtain unit 166, the luminance specifying unit 168, the specific object provisional determining unit 170, the grouping unit 172, the specific object determining unit 174, and the pattern matching unit 176 are configured to be operated by the central control unit 154 with software. However, the functional units may be configured with hardware.

The specific object determining unit 168 determines a specific object by, for example, whether or not the size of the target object is included in the width range 206 of the specific object. However, the present invention is not limited to such case. The specific object determining unit 168 may determine a specific object when various other conditions are also satisfied. For example, a specific object may be determined when a shift the relative distance in the horizontal direction and the vertical direction is substantially constant (continuous) in a target object or when the relative movement speed with respect to the z coordinate is constant. Such a shift in the relative distance in the horizontal direction and the vertical direction in the target object may be specified by linear approximation by the Hough transform or the least squares method.

The steps of the environment recognition method in this specification do not necessarily need to be processed chronologically according to the order described in the flowchart. The steps may be processed in parallel, or may include processings using subroutines.

The present invention can be used for an environment recognition device and an environment recognition method for recognizing a target object based on the luminances of the target object in a detection area.

The invention claimed is:

1. An environment recognition device comprising:
    a data retaining unit that retains a luminance range in association with a specific object;
    a luminance obtaining unit that obtains a luminance of a target portion in a detection area of an image;
    a luminance specifying unit that specifies a luminance of a road surface and a luminance of a predetermined reference portion other than a road surface from among the obtained luminances;
    a white balance deriving unit that derives a white balance correction value such that the luminance of the road surface is recognized as a specific color;
    a white balance performing unit that derives a corrected luminance by performing a white balance correction using the white balance correction value on the obtained luminances; and
    a specific object provisional determining unit that provisionally determines a specific object corresponding to the target portion with a corrected luminance of the target portion based on the association retained in the data retaining unit, wherein,
    when the luminance of the road surface changes by a first predetermined value or more under a state in which the luminance of the reference portion does not change by a second predetermined value or more, and a luminance of the road surface after the change is not a predetermined color, the white balance deriving unit maintains the white balance correction value prior to the change from when the change occurs until the luminance of the road surface returns to the predetermined color.

2. The environment recognition device according to claim 1, wherein the reference portion is a line that restricts a track on the road surface within the detection area.

3. The environment recognition device according to claim 2, wherein the road surface is a neighborhood area of the reference portion.

4. The environment recognition device according to claim 1, wherein the white balance deriving unit obtains the luminances of the road surface and the luminances of the reference portion at different times in a predetermined first partial area within the detection area to derive a change in luminance of the road surface and the reference portion.

5. The environment recognition device according to claim 2, wherein the white balance deriving unit obtains the luminances of the road surface and the luminances of the reference portion at different times in a predetermined first partial area within the detection area to derive a change in luminance of the road surface and the reference portion.

6. The environment recognition device according to claim 3, wherein the white balance deriving unit obtains the luminances of the road surface and the luminances of the reference portion at different times in a predetermined first partial area within the detection area to derive a change in luminance of the road surface and the reference portion.

7. The environment recognition device according to claim 1, wherein the white balance deriving unit obtains the luminances of the road surface and the luminances of the reference portion in a predetermined first partial area within the detection area and a second partial area that is separated from the first partial area in a vertical direction of the image within the detection area to derive a change in luminance of the road surface and the reference portion.

8. The environment recognition device according to claim 2, wherein the white balance deriving unit obtains the luminances of the road surface and the luminances of the reference portion in a predetermined first partial area within the detection area and a second partial area that is separated from the first partial area in a vertical direction of the image within the detection area to derive a change in luminance of the road surface and the reference portion.

9. The environment recognition device according to claim 3, wherein the white balance deriving unit obtains the luminances of the road surface and the luminances of the reference portion in a predetermined first partial area within the detection area and a second partial area that is separated from the first partial area in a vertical direction of the image within the detection area to derive a change in luminance of the road surface and the reference portion.

10. The environment recognition device according to claim 1, wherein the white balance deriving unit determines that the luminance of the road surface changes if a difference between a difference in a color phase selected on the basis of the maximum phase value representing the road surface and a difference in a color phase selected on the basis of minimum phase value representing the road surface is a third predetermined value or more.

11. The environment recognition device according to claim 1, wherein
the white balance deriving unit determines as the white balance correction value a ratio that causes a phase value in a color phase different from the color phase selected on the basis of the maximum phase value representing the road surface to be the maximum value.

12. The environment recognition device according to claim 1, wherein the white balance deriving unit determines as the white balance correction
Value a ratio that causes a phase value in a color phase different from the color phase selected on the basis of the second largest phase value representing the road surface to be the second largest.

13. The environment recognition device according to claim 1, wherein the white balance deriving unit determines as the white balance correction value a ratio that causes a phase value in a color phase different from the color phase selected on the basis of the minimum phase value representing the road surface to be the minimum value.

14. The environment recognition device according to claim 1, wherein the luminance specifying unit specifies the luminance of the road surface and the luminance of the reference area according to a predetermined area within the detection area that is limited in a vertical direction of the image based on a position of a preceding vehicle or a specific object in front of the subject vehicle.

15. An environment recognition method comprising:
obtaining a luminance of a target portion in a detection area of an image;
specifying a luminance of a road surface and a luminance of a predetermined reference portion that is other than the road surface from among the obtained luminances;
maintaining, when the luminance of the road surface changes by a first predetermined value or more under a state in which the luminance of the reference portion does not change by a second predetermined value or more, and if a luminance of the road surface after the change is not a predetermined color, a white balance correction value prior to the change from when the change occurs until the luminance of the road surface returns to the predetermined color, and deriving a white balance correction value so that the luminance of the road surface can be recognized as a specific color in cases other than the above;
deriving a corrected luminance by performing a white balance correction using the white balance correction value on the obtained luminance; and
provisionally determining a specific object corresponding to the target portion from a corrected luminance of the target portion based on an association of a luminance range and the specific object retained in a data retaining unit.

\* \* \* \* \*